United States Patent [19]

Broeckmann et al.

[11] Patent Number: 5,080,838
[45] Date of Patent: Jan. 14, 1992

[54] METHOD OF PRODUCING AN OPTICAL CABLE

[75] Inventors: Hermann-Josef Broeckmann; Veit Kölschbach, both of Cologne; Hans-Joachim Schmitz, Kerpen; Joerg-Michael Schneider, Bergisch-Gladbach, all of Fed. Rep. of Germany

[73] Assignee: U.S. Philips Corp., New York, N.Y.

[21] Appl. No.: 565,880

[22] Filed: Aug. 10, 1990

[51] Int. Cl.⁵ ............................................. B29D 11/00
[52] U.S. Cl. ...................................... 264/1.5; 264/1.6; 264/174
[58] Field of Search ...................... 264/1.5, 1.6, 174

[56] References Cited

U.S. PATENT DOCUMENTS

| | | | |
|---|---|---|---|
| 4,129,468 | 12/1978 | Knab | 156/148 |
| 4,154,783 | 5/1979 | Jackson | 264/1.5 |
| 4,366,667 | 1/1983 | Oestreich | |
| 4,458,476 | 7/1984 | Mayr et al. | 264/1.5 |
| 4,666,244 | 5/1987 | Van der Velde et al. | 350/96.23 |
| 4,724,024 | 2/1988 | Van der Velde et al. | 156/181 |
| 4,728,470 | 3/1988 | Einsle et al. | 264/1.5 |
| 4,772,435 | 9/1988 | Schlaeppi | 264/1.5 |
| 4,814,116 | 3/1989 | Oestreich et al. | 264/1.5 |

FOREIGN PATENT DOCUMENTS 235753 9/1987 European Pat. Off. .
3425649 1/1986 Fed. Rep. of Germany .
55-137505 10/1980 Japan .

*Primary Examiner*—James Lowe
*Attorney, Agent, or Firm*—William L. Botjer

[57] ABSTRACT

The invention relates to a method of producing an optical cable in which at least one optical waveguide fed forward from a supply reel is provided with a loosely surrounding jacket by means of extrusion, whose length is subsequently reduced relative to the length of the optical waveguide travelling through the expander and is thereafter wound-up. The excessive length of the optical waveguide is consequently distributed uniformly along the overall length of the optical cable, because of the fact that the optical waveguides paid-out from the supply reel are stranded before they are fed into the extruder.

13 Claims, 1 Drawing Sheet

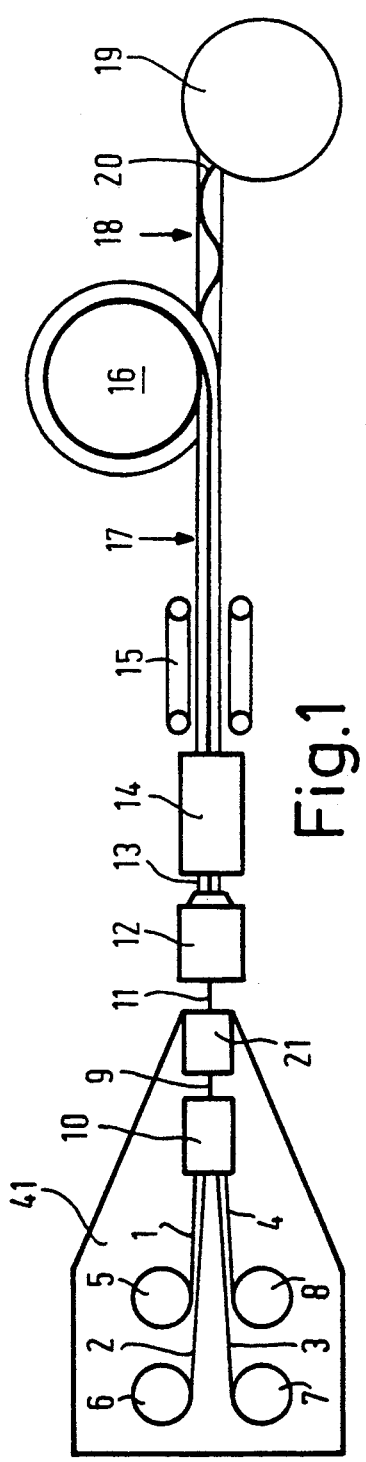
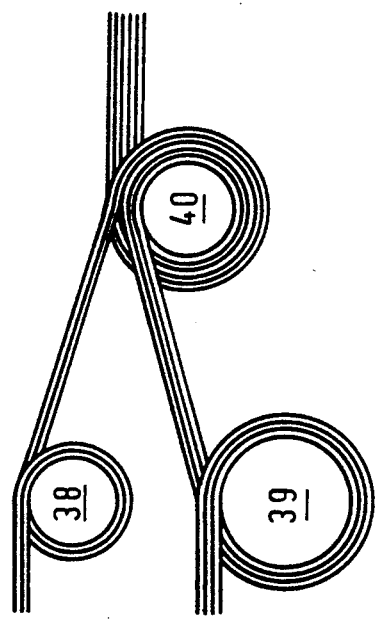
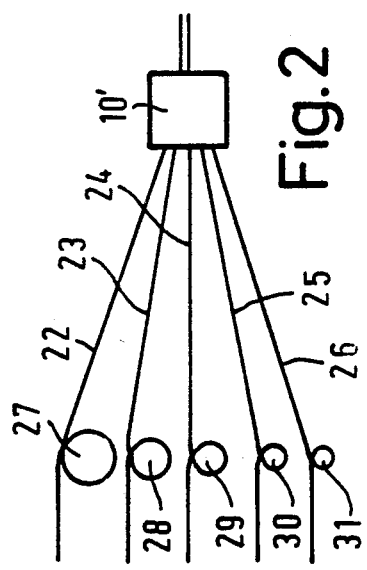
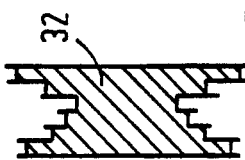

METHOD OF PRODUCING AN OPTICAL CABLE

BACKGROUND OF THE INVENTION

The invention relates to a method of producing an optical cable in which at least one optical waveguide fed-forward from a supply reel is provided with a loosely surrounding jacket by means of extrusion, whose length is subsequently reduced relative to the length of the optical waveguide travelling through the extruder and is thereafter wound up.

In a method of this type which is, for example, disclosed in EP-A1 0235753 the sleeve is stretched after extrusion and is then reduced in length by annealing. Reducing the length of the jacket can, however, also be effected by thermal shrinking, as is described in the DE-OS 3425649. In addition, combinations of thermally and elastically induced length reduction are possible. A further change in the length of the jacket can also be effected by crystalline shrinking.

In the known method, the excessive lengths of the optical waveguide(s) can be distributed irregularly along the length of the optical cable. Then there is in particular the risk of the optical waveguides being curved too much in certain regions along its length.

SUMMARY OF THE INVENTION

The invention has for its object to provide a method of the type defined in the opening paragraph in such a manner that the excessive length of the optical waveguide is distributed uniformly along the overall length of the optical cable.

This object is accomplished in that the optical waveguide(s) paid-out from the supply reel is/are stranded before entering the extruder.

When the jacket is provided on optical waveguides after they have been stranded, and when the jackets are reduced in length thereafter, the optical waveguide(s) are forced into a helical shape by the interior elastic stresses. Then, the length of twist of the helix corresponds to approximately the length of twist of the previously induced torsion. Compared to an undulatory run of a non-stranded optical waveguide a desired excessive length, when the optical waveguide is only slightly curved, can be accommodated in a cable jacket, whereas more specifically no zones with an unintentionally reduced radius of curvature occur. Stranding can, for example, suitably be effected by means of an arrangement disclosed in the US-PS 4129468. Also for the present invention it is advantageous for a plurality of optical waveguides to be first combined into a bundle, be stranded thereafter and then passed into the extruder. The bundle is stranded in its totality. After the length of the extruded jacket has been reduced the compact cohesion of the bundle is maintained and the total bundle is coiled as a helical spring. Preferably, the compact bundle consists of at least one optical waveguide ribbon, which is formed by a plurality of optical waveguides which are interconnected in a side-by-side relationship. Preferably, a plurality of optical waveguide ribbons is stacked. In such an optical cable the compactness of the bundle is reliably maintained, without one or more of the optical waveguide ribbons escaping from the uniform path of the helix.

The amount of the desired extra length can be determined and maintained very adequately and accurately when, after extrusion, the jacket is first passed through an annealing path, thereafter through a first take-up device and subsequently along the periphery of a disc feeder, whose pull force coupled to the jacket and at least one optical waveguide enclosed therein effects an elastic expansion of the jacket in the region between the first take-up device and the disc feeder.

In a bundle formed by a plurality of optical waveguide strips the helical path of the individual optical waveguide ribbons differs. To provide that the differences in length must not exclusively be obtained by different elastic longitudinal expansions of the individual optical waveguide ribbons, which might cause some of the optical waveguides to be excessively loaded, it proved to be advantageous that optical waveguides or groups of optical waveguides which are to be combined into a compact bundle are paid-out with different rates of travel from their supply reels.

This is advantageously effected in that the optical waveguides or groups of optical waveguides are passed via frictional rate of travel control elements after they are paid out from their supply rolls and before they are combined into a compact bundle.

In accordance with an advantageous embodiment it is provided that the rate of travel control elements of the optical waveguides or groups of optical waveguides are preferably rotatable wrapping rollers around which one turn is wrapped and whose diameter and/or numbers of revolutions are different.

In accordance with a particularly simple alternative the rate of travel control elements are stepped wrapping diameters of a roller. Then the optical waveguide ribbon which afterwards are to be coiled in the cable with the smallest coil radius around the central line of the jacket, is pulled at the lowest rate from its supply reel. In contrast thereto, the optical waveguide ribbon nearest to the inner surface of the jacket is pulled from the reel at the highest rate.

In a particularly simple manner it is alternatively possible to pass the optical waveguide ribbons, in order to control their rate of travel, one on top of the other together around a wrapping roller.

When the optical waveguide ribbons are supplied with different lengths, the stranded bundle already assumes to a certain extent the form of a coil before entering the extruder. It has been found to be advantageous that then the pulling force acting on the compact bundle between the disc feeder and the rate of travel control elements is rated such that all the optical waveguides experience at least substantially a longitudinal expansion. This achieves that the individual optical waveguide ribbons are rigidly kept in a side-by-side relationship also when travelling through the extruder. In this situation only the optical waveguide ribbon supplied at the lowest rate of travel from its supply roller is stranded, whilst the other ribbons are coiled with a greater or smaller radial spacing around the stranded optical waveguide ribbon.

BRIEF DESCRIPTION OF THE DRAWINGS

The invention and its advantages will now be described in greater detail by way of example with reference to the accompanying drawings.

FIG. 1 shows schematically an arrangement which is particularly suitable for performing the method according to the invention.

FIG. 2 shows five rate of travel control elements which are assigned to the individual optical waveguide ribbons.

FIG. 3 shows alternative rate of travel control elements which are in the form of stepped peripheral surfaces of a single roller.

FIG. 4 shows a rate of travel control element in which all the optical waveguide ribbons are wrapped on top of each other around one single roller.

FIG. 5 shows a possible feature for obtaining a plurality of rate of travel steps when rate of travel control elements as shown in FIG. 4 are used.

DETAILED DESCRIPTION OF THE PREFERRED EMBODIMENT

In FIG. 1 four optical waveguide ribbons 1 to 4, which are supplied from usually braked-down supply reels 5 to 8, are combined into a stacked array 9 in the bundling device 10. The supply reels 5 to 8, the bundling device 10 and a restrainer 21 are disposed on a rotating strander frame 41, so that the stack 9 is fed in the stranded form 11 into the extruder 12. In the extruder a jacket 13 is formed by extrusion at a large distance from the ribbon and cooled and fixed in the annealing region 14. The caterpillar conveyor belt 15 effects the discharge of the jacket from the extruder. The stranded stack 11 is merely pulled from the disc feeder 16.

The caterpillar conveyor belt 15 which is only force-coupled to the jacket 13 provides a smaller forward rate of the jacket 13 than the disc feeder 16, which advances the jacket 13 and the stranded stack 11 at an increased rate. As a result thereof the jacket 13 is elastically stretched in the region 17. After having left the disc feeder 16, the length of the jacket 13 is reduced in the region 18 because of the substantially pull force-free dereeling from the storage drum 19, so that then the stranded stack 11 is given a variation 20 of a coiled spring type. In this situation the broad sides of the optical waveguide ribbons extend approximately tangentially with respect to the instantaneous turn of the helix. The diameters of the helical turns are of course different for the individual waveguide ribbons, but the coil diameter of a specific microwave ribbon remains constant along the overall cable length, provided the previous stranding operation was effected with a constant length of twist.

By using pull forces of different strength for the supply reels 5 to 8 it can be achieved that the individual optical waveguide strips 1 to 4 are unwound, because of different elastic expansions, from their supply reels at different rates of travel. The optical waveguide ribbons which are coiled with a larger radius are supplied with longer length, so that no excessive longitudinal forces occur therein. By an appropriate choice of the rate distribution it can be accomplished that the pull and/or pressure forces in a stack formed from a plurality of optical waveguide ribbons are distributed such that also during manufacture, during laying of the cables or the load during operation on the optical cable, no unpermissible stresses occur in any of the optical waveguides.

An appropriate rate distribution of the individual optical waveguide ribbons can be accomplished in a particularly accurate and reliable manner when rate of travel control elements as shown in the FIGS. 2 to 5 are used. As is shown in FIG. 2, the optical waveguide ribbons 22 to 26 are passed, having been unwound from supply reels, not shown, around individually assigned wrapping rollers 27 to 31, before they are fed into the bundling arrangement 10'. These wrapping rollers may have different wrapping diameters at the same number of revolutions. Alternatively, they may however be of the same diameter but driven with a different number of revolutions. Combinations of these two solutions are also possible. In any case, the wrapping rollers 27 to 31 provide that the rates at which the individual optical waveguide ribbons are unwound from the supply reels are different. In the example shown in FIG. 2 the diameter of the wrapping rollers 27 to 31, which are driven with the same number of revolutions, decrease in the direction of the smallest roller 31. In the finished optical cable the optical waveguide ribbon 22 then has the largest coil diameter and the optical waveguide ribbon 26 has the smallest coil diameter.

By using longitudinal forces of corresponding valves between a disc feeder 16 of FIG. 1 and the wrapping rollers 27 to 31 it can be achieved that the individual optical waveguide ribbons maintain their tight cohesion after they have been discharged from the bundling arrangement.

The dereeling rates are preset in such manner via the diameter of the wrapping rollers that the individual optical waveguide ribbons in the finished optical cable extends with a force distribution (pull forces and/or pressure forces) which are made uniform such that at all possible mechanical requirements on the cable none of the individual optical waveguides is impermissibly expanded.

The individual wrapping rollers 27 to 31 can alternatively be combined, as is shown in FIG. 3, into one single wrapping roller 32 with stepped-down wrapping diameters.

In the alternative solution of FIG. 4 different wrapping diameters for the four optical waveguide ribbons shown there are obtained by wrapping these ribbons radially on top of each other around the wrapping rollers 37.

In the solution shown in FIG. 5, two optical waveguide ribbons extend radially one on top of the other around a wrapping roller 38, whilst three further optical waveguide ribbons are passed radially one on top of the other around a wrapping roller 39 of a larger diameter. The five optical waveguide ribbons together are then additionally passed radially one on top of the other around the wrapping roller 40. These wrapping rollers may have different number of revolutions and/or diameters, so that the relative rates of travel of the individual optical waveguide ribbons unwinding from their supply reels can be varied in many different ways.

The method of the invention was described in detail with reference to an emample of producing an optical cable constituted by a plurality of optical waveguide ribbons. In this method the number of optical waveguide ribbons can be chosen optionally. When only one single optical waveguide ribbon is used no rate of travel control devices are of course required.

The optical waveguide ribbons shown more specifically in FIG. 1 might also be replaced by individual optical waveguides.

We claim:

1. A method of producing an optical cable, in which optical waveguides fed forward from a supply reel are provided with a loosely surrounding jacket by means of extrusion, the improvement comprising: the optical waveguides supplied from the supply reel are stranded before entering the extruder and wherein after extrusion the jacket is first passed through an annealing region, thereafter through a first unloading arrangement which only grips the jacket and subsequent thereto along the peripheral region of a disc feeder, whose pull force coupled to the jacket and at least one enclosed optical waveguide effects an elastic expansion of the jacket in the region between the first unwinding arrangement and the disc feeder and the length of the jacket is thereafter reduced relative to the length of the waveguides and wound up.

2. A method as claimed in claim 1, wherein the a plurality of optical waveguides is first combined into a compact bundle, stranded thereafter and finally fed into the extruder.

3. A method as claimed in claim 2, wherein the compact bundle consists of at least one optical waveguide ribbon, which is formed of a plurality of optical waveguides which are interconnected in a side-by-side relationship.

4. A method as claimed in claim 3, wherein the compact bundle is formed of a plurality of superimposed optical waveguide strips.

5. A method as claimed in claim 2 wherein the optical waveguides or groups of optical waveguides to be combined into a compact bundle are unwound at different rates from their supply reels.

6. A method as claimed in claim 5 wherein the optical waveguides or groups of optical waveguides after having left their supply reels and before they are combined into a compact bundle are acted upon by friction-producing rate of travel control elements.

7. A method as claimed in claim 6, wherein the rate of travel control elements of the optical waveguides, respectively, are rotatable wrapping rollers around which one turn is wrapped, at least one of the diameter thereof and numbers of revolutions are different.

8. A method as claimed in claim 6, wherein the rate of travel control elements are in the form of stepped-down wrapping diameter regions of a roller.

9. A method as claimed in claim 6, wherein the optical waveguide ribbons are passed together on top of each other around a wrapping roller for the purpose of rate control.

10. A method as claimed in claim 5, wherein the pull force acting on the compact bundle between the disc feeder and the rate of travel control elements is adjusted such that at least substantially all the optical waveguides are subjected to a longitudinal force.

11. A method of producing an optical cable which is surrounded by a loosely surrounding jacket, comprising the steps of:
feeding at least two optical waveguides;
stranding said at least two optical waveguides together;
extruding said jacket about said stranded optical waveguides;
expanding said jacket through differential speed with said optical waveguides and
reducing the length of said jacket so as to provide a helical-like wind to the stranded optical waveguides within said loosely fitting jacket.

12. The method as claimed in claim 11, further including the step of annealing said jacket after it is extruded and before it is expanded.

13. The method as claimed in claim 11 further including the step of feeding said at least two optical waveguides at different speeds so as to compensate for differing length of optical waveguides in the finished cable.

* * * * *